United States Patent [19]

Kawai et al.

[11] 4,068,633

[45] Jan. 17, 1978

[54] IGNITION SYSTEM FOR INTERNAL COMBUSTION ENGINES

[75] Inventors: Noriaki Kawai, Okazaki; Hisaji Okamoto, Aichi; Yosiaki Takeda, Nagoya; Fukuzi Sano, Kariya; Akio Kakiuchi, Nagoya; Masami Manabe, Kariya; Takashi Nomura, Kariya; Sigeya Abe, Kariya, all of Japan

[73] Assignees: Toyota Jidosha Kogyo Kabushiki Kaisha, Toyota; Nippondenso Kabushiki Kaisha, Kariya, both of Japan

[21] Appl. No.: 635,069

[22] Filed: Nov. 25, 1975

Related U.S. Application Data

[60] Division of Ser. No. 386,874, Aug. 9, 1973, Pat. No. 3,930,474, which is a continuation of Ser. No. 116,343, Feb. 18, 1971, abandoned.

[30] Foreign Application Priority Data

| Feb. 27, 1970 | Japan | 45-17189 |
| Mar. 30, 1970 | Japan | 45-30471 |
| Apr. 9, 1970 | Japan | 45-34366 |
| Apr. 9, 1970 | Japan | 45-34367 |

[51] Int. Cl.² .............................................. F02P 5/04
[52] U.S. Cl. ............................................. 123/117 A

[58] Field of Search ........................ 123/117 A, 146.5

[56] References Cited

U.S. PATENT DOCUMENTS

| 1,785,902 | 12/1930 | Hardman | 123/117 A |
| 2,596,830 | 5/1952 | Udale | 123/117 A |
| 2,731,523 | 1/1956 | Downing | 123/117 A |
| 3,162,184 | 12/1964 | Walker | 123/117 A |
| 3,457,905 | 7/1969 | Jukes | 123/117 A |
| 3,704,697 | 12/1972 | Weymann | 123/117 A |
| 3,727,596 | 4/1973 | Panhard | 123/117 A |

Primary Examiner—Ronald B. Cox
Attorney, Agent, or Firm—Cushman, Darby & Cushman

[57] ABSTRACT

An ignition system for a spark-ignition type internal combustion engine comprising an ignition device capable of performing the spark timing control function, wherein in order to improve the engine torque, a temperature detecting element for detecting the temperature having an effect on the engine torque efficiency is provided in addition to the ingition device, so that the ignition device is actuated to advance the timing of the spark at a lower temperature as compared with that employed at a higher temperature in accordance with the temperature detected by the temperature detecting element.

7 Claims, 12 Drawing Figures

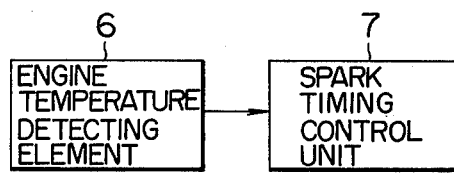
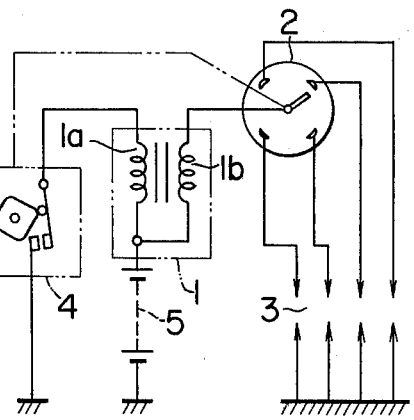
FIG. 2
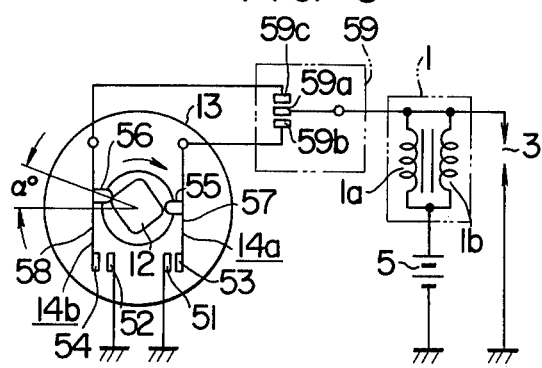
FIG. 8
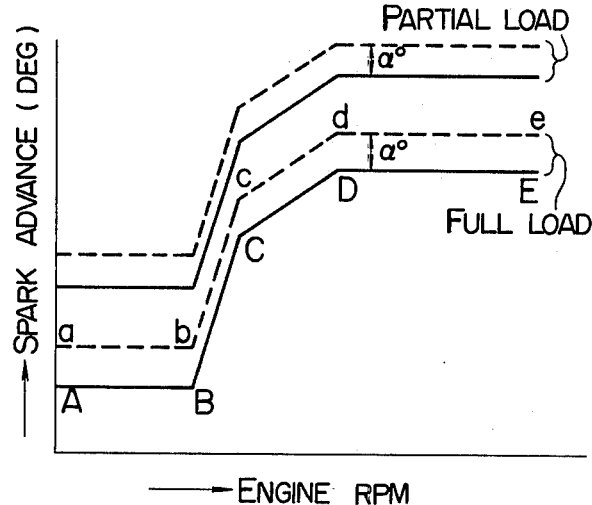
FIG. 9
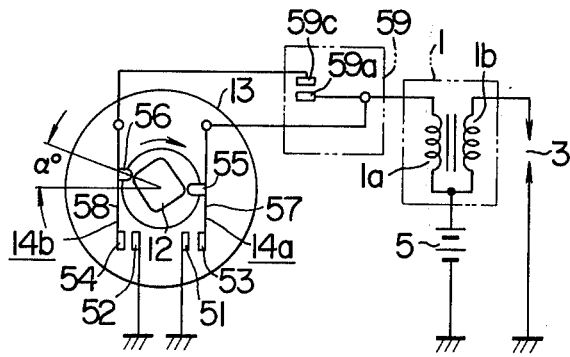
FIG. 11
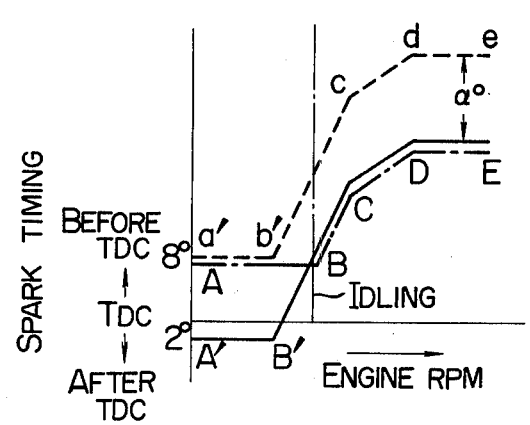
FIG. 10

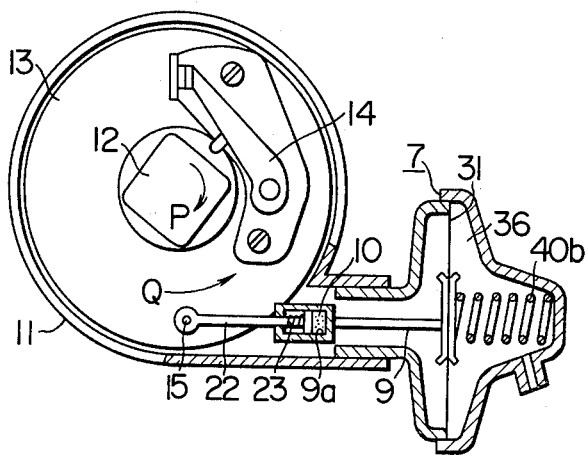
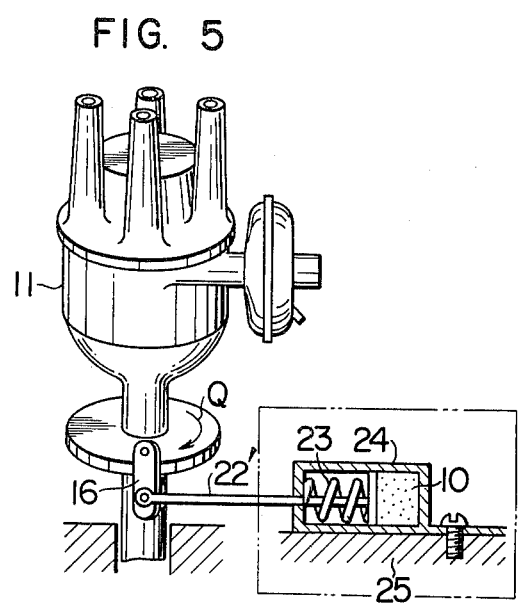
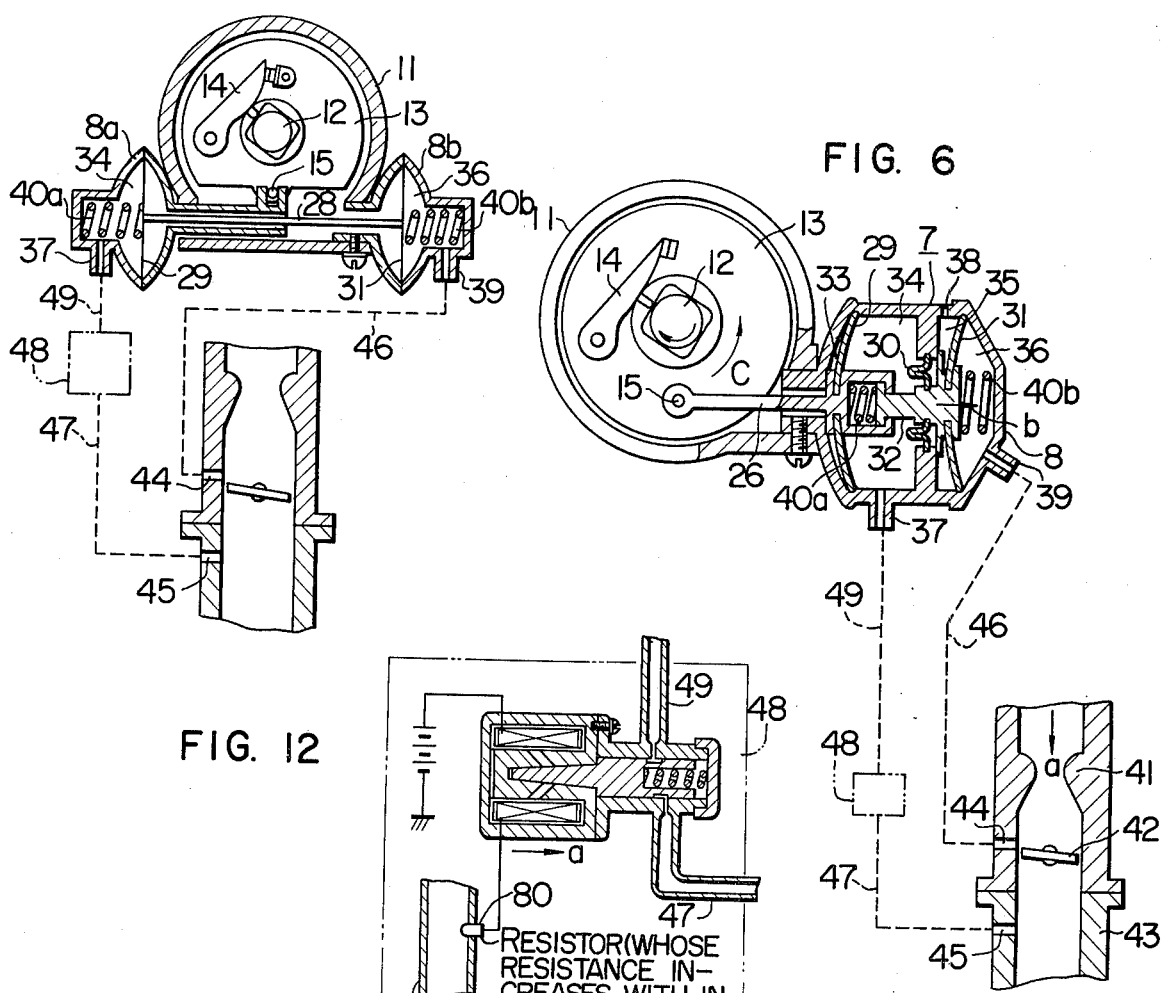
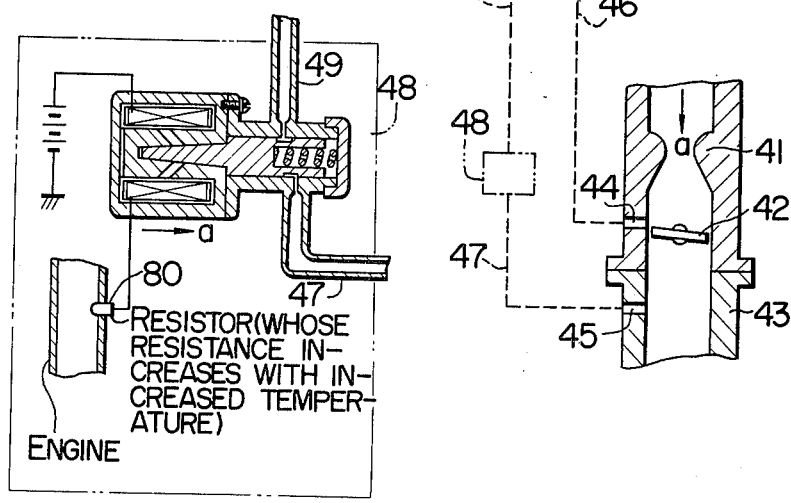

IGNITION SYSTEM FOR INTERNAL COMBUSTION ENGINES

RELATED APPLICATIONS

This application is a division of our copending application Ser. No. 386,874, filed Aug. 9, 1973, now U. S. Patent No. 3,930,474 which was a continuation of Ser. No. 116,343, filed Feb. 18, 1971, now abandoned.

BACKGROUND OF THE INVENTION

1. Field of the Invention

The present invention relates to an ignition system which also controls the spark timing of a spark-ignition type internal combustion engine according to temperatures to thereby distribute a high-voltage surge to the spark plug at the correct instant.

2. Description of the Prior Art

In the past, two types of ignition devices have been incorporated in the conventional ignition systems: these are a centrifugal spark advance mechanism for controlling the ignition timing of the engine according to the engine speed and a vacuum spark advance mechanism which advances or retards the timing of the spark according to the engine intake manifold vacuum. These mechanisms have primarily had their origin in the conception that the correct ignition timing of an engine could be satisfactorily determined according to two controlling factors, that is, the engine speed and the engine intake manifold vacuum.

In actual operation of an engine, however, a driver frequently experiences such trouble that while there was no difficulty with the hot engine (with the engine temperature in terms of the cooling water temperature higher than about 40° C), there was an inconvenience with the cold engine in that not only the engine ran unsatisfactorily, but also the engine lacked acceleration or other transient performance and this was particularly true in the winter months.

Of course, it has been known in the art that the engine torque efficiency could vary with different engine temperatures. In order to look into the cause of such variations, the inventors have conducted various experiments and much research and discovered that even with the same load and the same number of revolutions the range of the spark timing which would ensure stable operation of the engine differed depending on whether the engine was cold or hot and that the lower the engine temperature the greater the spark advance would be required.

SUMMARY OF THE INVENTION

The present invention has been made on the basis of the aforesaid new discovery and the primary object of the invention is therefore to provide an ignition system which comprises an engine temperature detecting element for detecting the temperature of an engine, and an ignition device for advancing the timing of the spark of the cold engine compared with that set for the hot engine according to the temperature detected by the engine temperature detecting element, whereby when the engine is cold, a spark advance (of the order of 5° to 15°) may be provided to ensure that the desired optimum ignition timing is set to obtain improved engine power.

Another object of the present invention is to provide various embodiments of an ignition device adapted to achieve the aforesaid primary object of the invention.

According to the present invention, there is a remarkable effect in that since the ignition system of the invention comprises a temperature detecting element for detecting temperatures which affect the engine torque efficiency, and an ignition device for advancing the spark timing at a low temperature relative to that which is set for use at a higher temperature according to the temperature detected by the temperature detecting element, the spark timing may be advanced when the engine is cold compared to when it is hot, thereby improving the power of the cold engine as well as the stability of the acceleration performance.

BRIEF DESCRIPTION OF THE DRAWING

FIG. 2 is a schematic diagram showing an ignition system for internal combustion engines of the present invention illustrated in FIG. 3.

FIG. 4 is a plan view of another embodiment of the system of the present invention showing a part in section.

FIG. 5 is a perspective view of a third embodiment of the system of the present invention showing the principal part in section.

FIG. 6 is a plan view of a fourth embodiment of the system of the present invention showing the principal part in section.

FIG. 7 is a plan view of a fifth embodiment of the system of the present invention showing the principal part in section.

FIG. 8 is an electrical wiring diagram of a sixth embodiment of the system of the present invention.

FIG. 9 is a spark advance characteristic diagram for explaining the operation of the sixth embodiment of the system of the present invention.

FIG. 10 is a diagram for explaining the operation of a modification of the sixth embodiment of the system of the present invention.

FIG. 11 is an electrical wiring diagram of the seventh embodiment of the system of the present invention.

FIG. 12 is a diagram showing a specific construction of the temperature change-over valve employed in the fourth and fifth embodiments of the system of the present invention.

DESCRIPTION OF THE PREFERRED EMBODIMENTS

Before proceeding with the explanation of the preferred embodiments of the present invention, it will be necessary to discuss the results of the experiments and researches conducted by the inventors with a view to investigating the influence of the engine temperatures on the engine torque efficiency.

Figure 1:
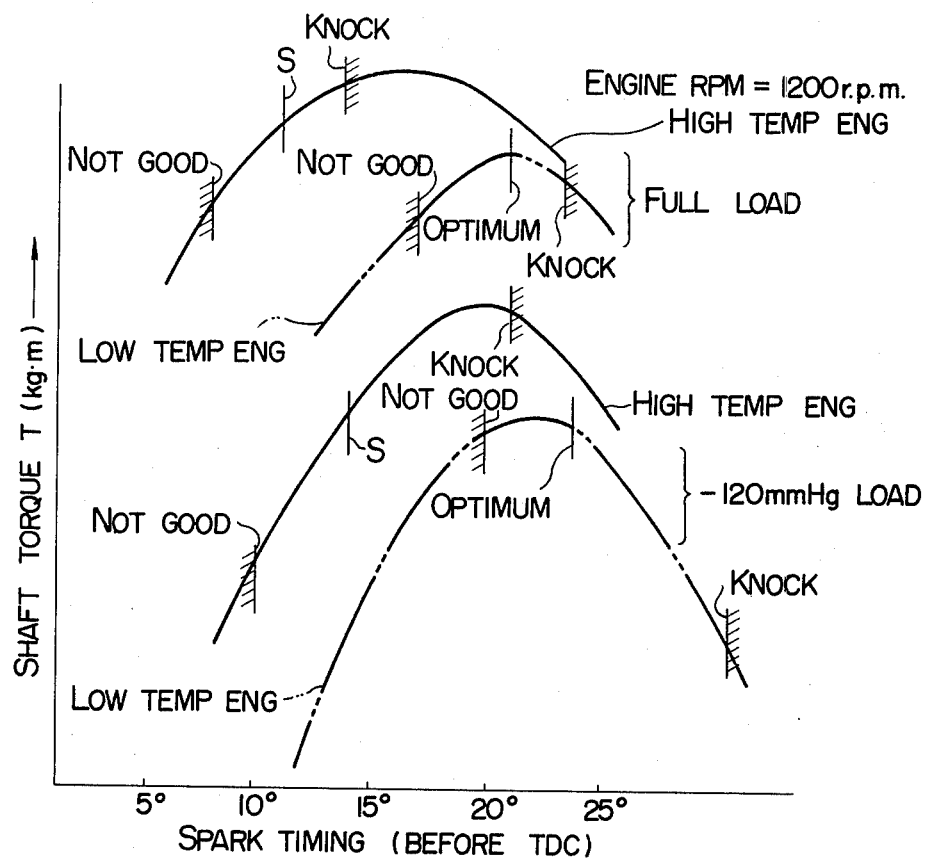
FIG. 1 is an engine torque efficiency curve which is effective for explaining the process of the mental concept which resulted in the present invention.

FIG. 1 illustrates, by way of an example, the results of the tests conducted to measure how the shaft torque T would vary in relation with the spark timing according to changes in the engine temperature when it was run at a speed of 1200 rpm. In the figure, "knock" represents the limit at which knocking may take place thus indicating that the curved portion on its right side cannot be employed, while "not good" represents the limit of the stable operation of an engine thus indicating that the curved portion on its left side cannot be employed. Accordingly, that portion of each curve represented by a thick line between the two limits indicates the range of the preferred spark timing.

As is apparent from FIG. 1, the torque curves with a hot engine (in terms of cooling water temperature above 80° C and oil temperature of over 60° C) are as shown by solid lines, while the torque curves with a cold engine (in terms of both cooling water and oil temperatures between 20° and 25° C) are represented by two-dot chain lines, thus indicating that as the engine temperature decreases, the preferred region of the spark timing that ensures stable operation of the engine will be moved to such a position that the spark occurs at a correspondingly earlier time than at the previous position and in this case the spark timing which ensures the maximum torque will also be advanced. With the conventional systems, the standard ignition time S is normally set at a point in the thickened portion of the solid torque curves in consideration of such factors as the variation in the manufacture and the like in order to obtain the maximum possible torque without allowing any knocking, and thus the time at which the spark occurs is fixed to the said standard ignition time S irrespective of changes in the engine temperature when the engine speed and load are constant. Consequently, as discovered by the inventors, the spark timing with a cold engine would practically move to that portion of torque curve where the engine could not run satisfactorily, thereby giving rise to the deficiencies as previously described.

The present invention contemplates the elimination of these deficiencies and for this purpose it provides, when the engine is cold, a spark advance (of the order of 5° to 15°) to set the ignition timing at the "desired" position shown in FIG. 1 so as to improve the engine output torque. In the discussion to follow, a first embodiment of the present invention will be explained with reference to the accompanying drawings in which those elements or parts as designated by the identical reference numerals indicate the identical or corresponding elements or parts.

Referring now to FIG. 2, numeral 1 designates an ignition coil, 1a a coil primary winding 1b a coil secondary winding, 2 a distributor for distributing high-voltage surges induced in the secondary winding 1b to spark plugs 3, 4 an ignition device which interrupts the power supply circuit to the primary winding 1a and which also performs the spark timing control function, 5 a DC power source. Numeral 6 designates a temperature detecting element for detecting the temperature which has an effect on the engine torque efficiency (e.g. the temperature of the cooling water, cylinder block, intake manifold, etc.), 7 a spark timing control unit for advancing the timing of the spark by the ignition device 4 so that in accordance with the temperature detected by the temperature detecting element 6 the spark timing at a lower temperature may be advanced over that used at a higher temperature. The temperature detecting element 6 and the spark timing control unit 7 are illustrated in detail in FIG. 3 by way of example.

Figure 3:
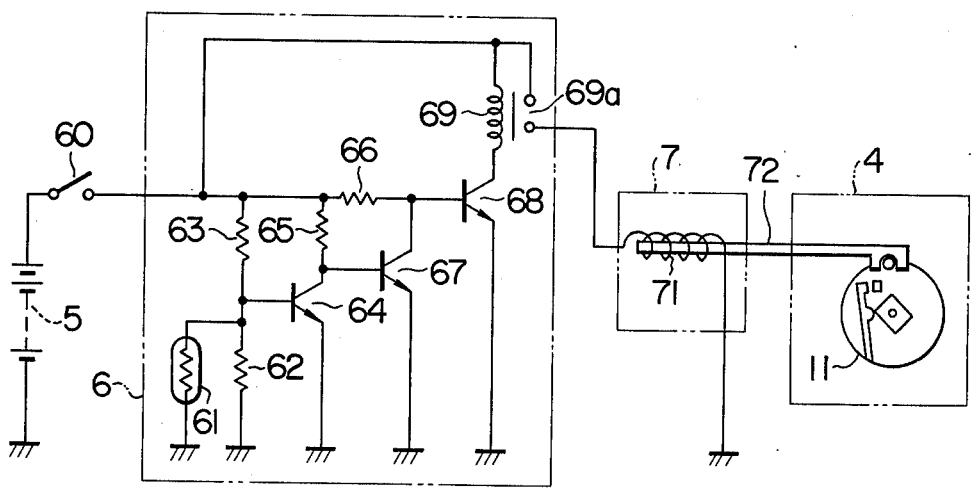
FIG. 3 is a schematic diagram showing an embodiment of the system of the present invention.

In FIG. 3, the DC power source 5 may consist of the storage battery installed in the car. Numeral 60 designates a switch which is operatively associated with an engine starting switch so that it is turned on while the engine is operating. Numeral 61 designates a thermistor for detecting the temperature that has an effect on the engine torque efficiency, such as, the temperature of water in the radiator, the engine oil temperature and the temperature of air in the rear of the fan (hereinafter simply referred to as the engine temperature); 62, 63, 65 and 66, resistors; 64, 67 and 68, power amplifying transistors; 69 a relay having normally-open contacts 69a. When the thermistor 61 detects a temperature lower than a predetermined value so that the resistance value of the thermistor 61 itself increases, the voltage between the base and emitter of the transistor 64 increases to conduct the transistor 64, whereupon the transistor 67 is cut off and the transistor 68 conducts to establish a power supply circuit to the relay 69. The spark timing control unit 7 comprises a solenoid 71 and a rod 72 connected to a housing 11 of the ignition device 4, whereby as the solenoid 71 is energized upon the closing of the contacts 69a of the relay 69, the rod 72 is attracted to cause the housing 11 to rotate through a predetermined angle thereby advancing the timing of the ignition of an engine by a predetermined degree.

With the construction described above, when the ignition device 4 is closed, a current is supplied to the primary winding 1a of the ignition coil 1 from the power source 5 and a contact breaker in the ignition device 4 opens, so that the power supply circuit to the primary winding 1a is interrupted, inducing a high voltage in the secondary winding 1b of the ignition coil 1. This high voltage is then delivered to the correct spark plug 3 by the action of the distributor 2.

Then, the engine temperature is always detected by the temperature detecting element 6 so that in response to the temperature detected by the temperature detecting element 6 the spark timing control unit 7 advances the spark timing at a low temperature (e.g., below 40° C) relative to that used when it is high (e.g., above 40° C), that is, the time when the power supply circuit to the primary winding 1a is interrupted by the action of the ignition device 4 is advanced.

While the means for advancing the spark timing of the cold engine relative to that of the hot engine has been explained in connection with the situation wherein the spark advance characteristics set for higher engine temperatures are moved in a direction to provide any given degree of spark advance at low engine temperatures, there is no doubt that the spark advance characteristics may be preselected to suit the ignition timing characteristics required at low engine temperatures so that by moving these spark advance characteristics in a direction to retard the spark timing at higher engine temperatures, the spark timing may be advanced at the lower temperatures as compared to that set for the higher temperatures.

Another embodiment of the ignition system according to the present invention will now be explained. Referring to FIG. 4 illustrating the second embodiment of the ignition system of the present invention, numeral 11 designates a housing of the ignition device, 12 a cam linked to the engine and adapted to rotate in the direction shown by an arrow P, 13 a movable breaker plate mounted in the housing of the ignition device 11 rotatable about the cam 12, 14 a contact breaker mounted on the breaker plate 13 and adapted to be operated by the cam 12 to interrupt the primary circuit of the ignition coil (not shown). Numeral 7 designates a vacuum spark advance mechanism adapted so that in response to a vacuum admitted into a vacuum chamber 36, a diaphragm 31 is caused to move against a spring 40b thereby actuating a spark advance rod 9. The spark advance rod 9 is provided at its forward end with a chamber 9a containing a material which is responsive to a temperature so as to expand of contract, such as, a wax 10, and the rod 9 is connected by way of the wax 10 to an auxiliary rod 22 rotatable about a pin 15 mounted on the movable breaker plate 13. Numeral 23 designates a spring for causing the auxiliary rod 22 to respond to a change in the volume of the wax 10.

In operation, the cam 12 is rotated according to the engine speed in the direction shown by the arrow P by means of a centrifugal spark advance mechanism (not shown), so that the breaker plate 13 is rotated according to the engine load in the direction shown by an arrow Q by the vacuum spark advance mechanism 7, thereby determining the spark advance characteristic. In this case, the spark advance characteristic obtainable when the wax 10 has expanded its volume to the fullest extent will be the one set for a high engine temperature condition.

With the system constructed as described above, when the engine temperature is higher than a predetermined value, the temperature within the housing of the ignition device 11 is also increased so that the wax 10 disposed between the auxiliary rod 22 and the spark advance rod 9 exhibits the maximum cubical expansion. The spark advance characteristic obtained under this condition is the one set for the higher engine temperature condition.

On the other hand, when the engine temperature is below a predetermined value, the wax 10 contracts in response to this temperature so that the auxiliary rod 22 is caused, under the action of the spring 23, to reduce the distance between it and the spark advance rod 9 in response to the change in the volume of the wax 10. The breaker plate 13 is then rotated in the spark advancing direction Q by way of the pin 15 in accordance with the amount of movement of the auxiliary rod 22, so that the time that the contact breaker 14 is opened by the cam 12 (i.e., the ignition timing) is advanced with respect to the spark timing previously set for the higher engine temperature. It should be noted here that since the degree of spark advance as determined by a change in the volume of the wax 10 will be gradually automatically increased as the engine temperature decreases, proper spark timing, suitable for any given temperature, can always be ensured throughout the range of lower engine temperatures.

While, in the second embodiment described above, the breaker plate 13 is rotated in accordance with a change in the volume of the wax 10 so that the contact breaker 14 is moved in the spark advancing direction Q with respect to the cam 12, a modification such as a third embodiment shown in FIG. 5 is also possible, wherein a chamber 24 containing a wax 10 is mounted on a portion 25 such as the cylinder block from which the engine temperature may be detected, and the forward end of a rod 22' adapted to respond to a change in the volume of the wax 10 by virtue of a spring 23 mounted in the chamber 24 is rotatably attached to an arm 16 radially secured to a housing of the ignition device 11, so that the housing of the ignition device 11 may be rotated in response to a change in the volume of the wax 10 to thereby move a contact breaker 14 in a direction which provides a spark advance with respect to a cam 12. As the temperature-sensitive material whose volume changes with temperature, bimetal elements or the like may also be used in addition to the above-mentioned wax.

Referring now to FIG. 6, there is shown a fourth embodiment of the ignition system of the present invention, in which a first control rod 26 of a vacuum spark timing control unit 7 is rotatably mounted on a pin 15 secured on a movable breaker plate 13.

The vacuum spark timing control unit 7 comprises first, second and third diaphragms 29, 30 and 31 which are housed within a casing 8. The first control rod 26 is secured at the central portion of the first diaphragm 29, while a second control rod 32 is secured at the central portions of the second and third diaphragms 30 and 31. The first and second control rods 26 and 32 are slidable and a compression spring 40a is disposed therebetween. Chambers 33, 34, 35 and 36 are defined between the casing 8 and the first diaphragm 29, the first and second diaphragms 29 and 30, the second and third diaphragms 30 and 31, and the third diaphragm 31 and the casing 8, respectively. The chamber 33 is connected to the atmosphere and a vacuum inlet port 37 is formed in the chamber 34, while the chamber 35 is provided with an air inlet port 38 and the chamber 36 includes a vacuum inlet port 39. A compression spring 40b is also mounted in the chamber 36.

Numeral 41 designates a carburetor, 42 a throttle valve, 43 an inlet pipe, and an arrow a designates the direction in which fuel and air enter. Numeral 44 designates a conventional vacuum intake port provided at a point slightly upstream of the throttle valve 42 in its fully closed position and communicating with the vacuum inlet port 39 of the chamber 36 by way of a line 46 shown by a dotted line. Numeral 45 designates a vacuum intake port formed in the inlet pipe 43, which is led to the vacuum inlet port 37 of the chamber 34 by way of a temperature change-over valve 48 through lines 47 and 49 shown by dotted lines. The temperature change-over valve 48 is sensitive to the cooling water temperature so that when the temperature of the cooling water is low (e.g. the cooling water is at a temperature below 40° C), it causes the lines 47 and 49 to communicate with each other, while it closes the line 47 and opens the line 49 to the air when the temperature of the cooling water is high (e.g. above 40° C).

When a vacuum corresponding to the opening of the throttle valve 42 or the engine load is admitted into the chamber 36 by way of the vacuum intake port 44, line 46 and vacuum inlet port 39, the second diaphragm 31 is moved to the right as shown by an arrow b against the spring 40b and this movement is then transmitted to the movable breaker plate 13 by way of the second control rod 32, first control rod 26 and pin 15, thereby rotating the breaker plate 13 in a direction to provide a spark advance (i.e., the direction shown by an arrow c). In other words, a vacuum advance of the kind known in the art is obtained.

On the other hand, when the engine temperature is low, the temperature change-over valve 48 communicates the lines 47 and 49 with each other so that the engine inlet pipe vacuum downstream of the throttle valve is admitted into the chamber 34 by way of the lines 47 and 49 and through the vacuum inlet port 37. This vacuum causes the first diaphragm 29 to move in the direction shown by an arrow b against the spring 40a so that the movable breaker plate 13 is rotated in the spark advancing direction C by means of the first control rod 26. In other words, there results a spark advancing action due to the vacuum admitted into the chamber 36 plus an additional spark advancing action due to the vacuum admitted into the chamber 34, thereby advancing the spark timing at a low engine temperature relative to that set for a higher engine temperature condition.

While the engine intake manifold vacuum applied to the vacuum intake port 45 will be decreased rapidly upon the opening of the throttle valve 42, the spark timing may be advanced under any important operating conditions of the cold engine as compared with the set for the hot engine, if the response characteristic of the first diaphragm 29 in the chamber 34 into which said vaccuum is introduced is sufficiently improved by suitably selecting the spring constant, compression load and the like of the spring 40a.

In the fourth embodiment described above, the first vacuum chamber 36 for providing a spark advancing action when the engine is hot and the second vacuum chamber 34 for providing a spark advancing action with the engine cold are both housed within the single casing 8. However, as will be seen from a fifth embodiment of the present invention shown in FIG. 7, the first and second vacuum chambers 36 and 34 may be oppositely disposed with the ignition device housing 11, so that the diaphragms 31 and 29 in the chambers 34 and 36, respectively, are connected with each other by way of a connecting rod 28 with a casing 8b of the first vacuum chamber 36 being secured to the ignition device housing 11 and a casing 8a of the second vacuum chamber 34 being fit on the pin 15 of the movable breaker plate 13. Of course, the means for causing the first and second vacuum chambers 36 and 34 to rotate the movable breaker plate 13 in the direction to provide a spark advance may take various other forms than the abovementioned constructions, and it is also possible to construct so that instead of directly rotating the movable breaker plate 13, the housing of the ignition device 11 is rotated to thereby move the breaker plate 13 in a direction which provides a spark advance. The detailed construction of the temperature change-over valve 48 is illustrated in FIG. 12 by way of example.

While the fourth and fifth embodiments as described above are effective in improving the engine output under low engine temperature conditions because of the fact that not only the conventional spark advancing action of vacuum type is obtainable with the hot engine, but also the spark timing with the cold engine can be advanced relative to that set for the hot engine, the present invention is especially effective in that since a spark advance at low engine temperatures is obtained by means of the engine intake manifold vacuum, no spark advancing action will be provided when starting the engine with the result that the temperature of the engine at the start thereof has nothing to do with the present invention and thus the present invention can be incorporated without making any special arrangements in those engines requiring conventional ignition timing.

Next, a sixth embodiment of the ignition system of the present invention will be explained. Referring to FIG. 8, numerals 14a and 14b designate first and second contact breakers actuated by a breaker cam 12 to close and open the circuits, 13 a movable breaker plate. Each of the contact breakers 14a and 14b comprises either one of movable contacts 53 and 54, movable arms 57 and 58 respectively provided with lifters 55 and 56 directly engageable with the cam 12, and stationary contacts 51 and 52, and the contact breakers 14a and 14b are mounted on the movable breaker plate 13 in such a relation that the first contact breaker 14a always opens at a point which leads the second contact breaker 14b by $\alpha°$.

Numeral 59 designates a thermal switch having a movable contact 59a and stationary contacts 59b and 59c and adapted to detect the engine temperature such as the temperature of the cooling water, whereby the movable contact 59a engages the lower stationary contact 59b when the engine temperature is below a predetermined value (e.g., the cooling water temperature below about 40° C), while the movable contact 59a engages the upper stationary contact 59c when the engine temperature is higher than a predetermined value. The thermal switch 59 has its movable contact 59a electrically connected to a primary wiring 1a of an ignition coil 1, lower stationary contact 59b to the movable contact 53 of the first contact breaker 14a and upper stationary contact 59c to the movable contact 54 of the second contact breaker 14b.

The breaker cam 12 is adapted to rotate clockwise as shown by the arrow in synchronism with the engine and it is also rotated in the direction of the arrow by a centrifugal spark advance mechanism (not shown) in accordance with the engine speed, while the movable breaker plate 13 is rotated counterclockwise by a vacuum spark advance mechanism (not shown) in accordance with the engine load.

With the construction described above, when the engine temperature exceeds a predetermined value, the movable contact 59a of the thermal switch 59 engages the upper contact 59c so that the primary circuit of the ignition coil 1 is interrupted by the second contact breaker 14b. In other words, when the cam lobe of the breaker cam 12 and the lifter 56 of the movable arm 58 engages with each other at the time as determined by the centrifugal and vacuum spark advance mechanisms, the contacts 54 and 52 open so that the energization of the primary winding 1a of the ignition coil 1 is interrupted thus inducing a high voltage in the secondary winding 1b and the ignition spark is jumped to a spark plug 3. In this case, the spark advance characteristic will be as shown by a solid line curve ABCDE in FIG. 9 according to the variations of the engine speed and load.

On the other hand, under low temperature conditions with the engine temperature being below a predetermined value, the movable contact 59a of the thermal switch 59 touches the lower contact 59b so that the primary circuit of the ignition coil 1 is interrupted by the first contact breaker 14a. The first contact breaker 14a always opens and closes at a point which leads the second contact breaker 14b by $\alpha°$ (about 5° to 15°). Therefore, the spark advance characteristic under low engine temperature conditions will be as shown by a broken line curve abcde in FIG. 9.

With the embodiment described above, if the second contact breaker 14b is employed to interrupt the primary circuit of the ignition coil 1, as previously explained, the time that the spark occurs is delayed by $\alpha°$ as compared with the case when the primary circuit is interrupted by the first contact breaker 14a and hence the second contact breaker 14b stays closed even when the first contact breaker 14a is opened, so that the ignition spark always jumps to the spark plug 3 by the action of the second contact breaker 14b despite the first contact breaker 14a being inserted in the primary circuit. Accordingly, the thermal switch 59 may be constructed to function to always connect the first contact breaker 14a to the primary winding 1a of the ignition coil 1 as is the case with a seventh embodiment shown in FIG. 11.

While the engine generally has a margin with respect to the proper ignition timing when starting under high engine temperature conditions and thus the engine can be started even if the ignition of the engine is timed at a point past the top dead center, in some designs the ignition timing required for starting the cold engine is primarily set (for example, about 8° before the top dead center). In this case, in order that no spark advance may be allowed while starting the engine under low temperature conditions, but the spark timing may be advanced after the engine has been started, the application of such designs as will be explained hereunder may prove to be effective.

In one design, with the circuit shown in FIG. 8 a normally open switch which is operatively associated with the engine starting switch to stay closed only while the starter motor is in operation, is connected in parallel with the contacts 59a and 59c of the thermal switch 59, so that during the starting of the engine the ignition spark can always be delivered by the action of the second contact breaker 14b.

In another design, as shown in FIG. 10, the usual spark advance characteristic with respect to the engine speed which is shown by the one-dot chain line ABCDE is replaced with the spark advance characteristic shown by the solid line curve A'B'CDE starting at a point A' past the top dead center and having a spark advance area as early as under idling conditions, that is, when the engine has been started, so that if an degree spark advance is provided (as shown by the broken line curve a'b'cde) under low engine temperature conditions, the spark timing employed when starting the engine becomes the proper timing (about 8° before the top dead center, for example).

According to the system of the sixth embodiment of the present invention described above, the spark timing under low engine temperature conditions can be advantageously be advanced as compared with that set for the hot engine, so that the combustion in the engine cylinder is improved, more power is produced and an improved acceleration stability is obtained. Moreover, in the system of the sixth embodiment of the invention one of the contact breakers may consist of the existing contact breaker and therefore the abovementioned spark advance under low engine temperature conditions can be obtained with a simple construction in which a single contact breaker and a thermal switch are added to the conventional system.

We claim:

1. An ignition system for an spark-ignition type internal combustion engine comprising an ignition device capable of performing the spark timing control function, and a temperature detecting element for detecting the temperature having an effect on the engine torque efficiency, whereby said ignition device is operated so that the spark timing under a low temperature condition is advanced as compared to that used under a high temperature condition according to the temperature detected by said temperature detecting element, wherein said ignition device comprises a first vacuum spark advance mechanism having a first casing slidably secured to the housing of said ignition device and connected to said movable breaker plate, and a second vacuum spark advance mechanism having a second casing secured to a housing of said ignition device, said first and second casings being secured to said housing facing each other, said first casing including a first diaphragm disposed therein, said second casing including a second diaphragm disposed therein, said first casing and said first diaphragm defining a first vacuum chamber therebetween, said second casing and said second diaphragm defining a second vacuum chamber therebetween, said first and second diaphragms being connected with each other by a connecting rod, whereby said first vacuum chamber is communicated with said first vacuum intake port by way of said temperature changeover valve, and said second vacuum chamber is directly communicated with said second vacuum intake port.

2. An improved ignition system operable from an electric power source for use in a spark-ignition type internal combustion engine having first and second negative pressure sources and having at least one spark plug, to further advance the spark at a selected engine temperature corresponding to less than a given temperature and to relatively retard the spark above that temperature, comprising:

an ignition coil having a primary winding connectable in circuit with said power source for receiving electric current therefrom, and a secondary winding connectable in circuit with said spark plug;

a breaker housing having a base plate and a cam shaft rotating in synchronism with said engine;

breaker means having a stationary contact fixed on said base plate, a breaker arm rotatably mounted on said base plate and abutting on said cam shaft, and a movable contact fixed at one end of said breaker arm, whereby said movable contact is disengaged from said stationary contact according to the movement of said breaker arm actuated by said cam shaft, said contacts being connected in series with said primary winding for interrupting said power source electric current so as to induce a high voltage in said secondary winding;

first vacuum advance means including a first casing fixed to said breaker housing, a first diaphragm disposed in said first casing to form a first vacuum chamber, and a first rod connected at its one end of said first diaphragm;

first pipe means extending from said first vacuum chamber and connectable to said first source of negative pressure for supplying negative pressure to said first vacuum chamber;

second vacuum advance means including a second casing slidably mounted on said breaker housing, a second diaphragm disposed in said second casing to form a second vacuum chamber, and a second rod connected at its one end to said second casing, the other end of said second rod being connected to said base plate and the other end of said first rod being connected to said second diaphragm, whereby said base plate is rotated in one direction in proportion to the displacements of said first and second diaphragms so as to advance spark timing;

second pipe means extending from said second vacuum chamber and connectable to said second source of negative pressure for supplying negative pressure to said second vacuum chamber;

temperature detecting means for detecting temperatures of said engine; and valve means, provided in said second pipe means, for opening and closing said second pipe means to said second negative pressure source when the temperature detected by said temperature detecting means is, respectively, substantially below and substantially above said given engine temperature to effect spark advance, in addition to that caused by said first vacuum advance means, when said valve means opens said second pipe means and to relatively retard said spark when said second pipe is closed to said second source by said valve means.

3. An ignition system as in claim 2 wherein said selected temperature corresponds to about 40° C engine coilant temperature.

4. An ignition system for an internal combustion engine comprising:

an ignition coil having a primary winding and a secondary winding connected to a spark plug mounted in an engine;

a power source connected in circuit with said primary winding for supplying an electric current to said primary winding;

a breaker housing for installing a base plate and a cam shaft rotating in synchronism with said engine;

breaker means having a stationary contact fixed on said base plate, a breaker arm rotatably mounted on said base plate and abutting on said cam shaft, and a movable contact fixed at one end of said breaker arm, whereby said movable contact is disengaged from said stationary contact according to the movement of said breaker arm actuated by said cam shaft, said breaker means being connected in series with the circuit including said primary winding and said power source to interrupt the electric current supplied from said power source to said primary winding so as to induce a high voltage in said secondary winding;

first vacuum advance means including a first casing fixed to said breaker housing, a first diaphragm disposed in said first casing to form a first vacuum chamber, and a first rod connected at its one end to said first diaphragm;

first pipe means, connected between said first vacuum chamber and a first source of negative pressure, for supplying the negative pressure to said first vacuum chamber;

second vacuum advance means including a second casing slidably mounted on said breaker housing, a second diaphragm disposed in said second casing to form a second vacuum chamber, and a second rod connected at its one end to said second casing, the other end of said second rod being connected to said base plate and the other end of said first rod being connected to said second diaphragm, whereby said base plate is rotated in one direction in proportion to the displacements of said first and second diaphragms so as to advance spark timing;

second pipe means, connected between said second vacuum chamber and a second source of negative pressure, for supplying the negative pressure to said second vacuum chamber;

temperature detecting means for detecting temperatures of said engine; and valve means, provided in said second pipe means, for closing said second pipe means when a temperature detected by said temperature detecting means exceeds a predetermined value.

5. An ignition system for an internal combustion engine comprising:

an ignition coil having a primary winding and a secondary winding connected to a spark plug mounted in an engine;

a power source connected in circuit with said primary winding for supplying an electric current to said primary winding;

a breaker housing for installing a base plate and a cam shaft rotating in synchronism with said engine;

breaker means having a stationary contact fixed on said base plate, a breaker arm pivotally mounted on said base plate and abutting on said cam shaft, and a movable contact fixed at one end of said breaker arm, whereby said movable contact is disengaged from said stationary contact according to the movement of said breaker arm actuated by said cam shaft, said breaker means being connected in series with the circuit including said primary winding and said power source to interrupt the electric current supplied from said power source to said primary winding so as to induce a high voltage in said secondary winding;

vacuum advance means including, a first vacuum housing fixed to said breaker housing, a first diaphragm disposed in said first vacuum housing for forming a first vacuum chamber, first pipe means connected between said first vacuum chamber and a first source of negative pressure for supplying the negative pressure to said first vacuum chamber, a second vacuum housing movably mounted on said breaker housing, a second diaphragm disposed in said second vacuum housing for forming a second vacuum chamber, and second pipe means operatively connected between said second vacuum chamber and a second source of negative pressure for supplying the negative pressure to said second vacuum chamber, said first diaphragm being connected with said second diaphragm which is connected with a portion of said second vacuum housing, another portion of said second vacuum housing and said second diaphragm being connected with said base plate for rotating the same, whereby the spark timing is advanced in proportion to the amount of negative pressure supplied to said first and second vacuum chambers;

temperature detecting means for detecting temperatures of said engine; and valve means disposed in said second pipe means and having an opened state for connecting said second vacuum chamber with said second source of negative pressure and a closed state for connecting said second vacuum chamber with the atmosphere, said valve means being actuated to change from one of said states to the other when a temperature detected by said temperature detecting means exceeds a predetermined value, whereby the amount of spark timing advance reached when the temperature of said engine is lower than said predetermined value is greater than that reached when the temperature of said engine is higher than said predetermined value.

6. An improved ignition system operable from an electric power source for use in a spark-ignition type internal combustion engine having first and second negative pressure sources and having at least one spark plug, to further the spark at a selected engine temperature corresponding to less than a given temperature and to relatively retard the spark above that given temperature, comprising:

an ignition coil having a primary winding connectable in circuit with said power source for receiving electric current therefrom, and a secondary winding connectable in circuit with said spark plug;

a breaker housing having a base plate and a cam shaft rotating in synchronism with said engine;

breaker means having a stationary contact fixed on said base plate, a breaker arm pivotally mounted on said base plate and abutting on said cam shaft, and a movable contact fixed at one end of said breaker arm, whereby said movable contact is disengaged from said stationary contact according to the movement of said breaker arm actuated by said cam shaft, said contacts being connected in series with the circuit of said primary winding for interrupting said power source electric current so as to induce a high voltage in said secondary winding;

vacuum advance means including, a first vacuum housing fixed to said breaker housing, a first diaphragm disposed in said first vacuum housing for forming a first vacuum chamber, first pipe means extending from said first vacuum chamber and connectable to said first source of negative pressure for supplying negative pressure to said first vacuum chamber, a second vacuum housing movably mounted on said breaker housing, a second diaphragm disposed in said second vacuum housing for forming a second vacuum chamber, and second pipe means extending from said second vacuum chamber connectable to said second source of negative pressure for supplying negative pressure to said second vacuum chamber, said first diaphragm being connected with said second diaphragm which is connected with a portion of said second vacuum housing, another portion of said second vacuum housing being connected with said base plate for rotating said plate, whereby the spark timing is advanced in proportion to the amount of negative pressure supplied to said first and second vacuum chambers;

temperature detecting means for detecting temperatures of said engine; and valve means disposed in said second pipe means and having an opened state for connecting said second vacuum chamber with said second source of negative pressure and a closed state for connecting said second vacuum chamber with the atmosphere, said valve means being actuated to change from one of said states to the other when the temperature detected by said temperature detecting means exceeds said given temperature, whereby the amount of spark timing advance reached when the temperature of said engine is lower than said selected temperature is greater than that reached when the temperature of said engine is higher than said given temperature.

7. An ignition system as in claim 6 wherein said given temperature corresponds to an engine coolant temperature of about 40° C.

* * * * *